May 17, 1932. P. CARLSON 1,858,880

WINDSHIELD HINGE

Filed Sept. 11, 1928

Inventor
Philip Carlson
By Wooster & Davis
Attorneys.

Patented May 17, 1932

1,858,880

UNITED STATES PATENT OFFICE

PHILIP CARLSON, OF TRUMBULL, CONNECTICUT, ASSIGNOR, BY MESNE ASSIGNMENTS, TO THE BRIDGEPORT-CITY TRUST COMPANY, OF BRIDGEPORT, CONNECTICUT, A CORPORATION OF CONNECTICUT

WINDSHIELD HINGE

Application filed September 11, 1928. Serial No. 305,193.

This invention relates to a hinge construction, particularly a hinge construction for a wind shield on an automobile, and has for an object to provide an improved hinge construction for this purpose which will uniformly and securely mount the shield throughout its entire length.

It is a further object of the invention to provide a hinge which may be made of sheet metal and in which no separate hinge pin is required.

It is also an object of the invention to provide an improved hinge construction which will more securely support the wind shield with less liability of rattling and is much easier to install than the hinges now generally employed.

With the foregoing and other objects in view, the invention consists in certain novel features of construction, combinations and arrangements of parts as will be more fully disclosed in connection with the accompanying drawings.

Figure 1:
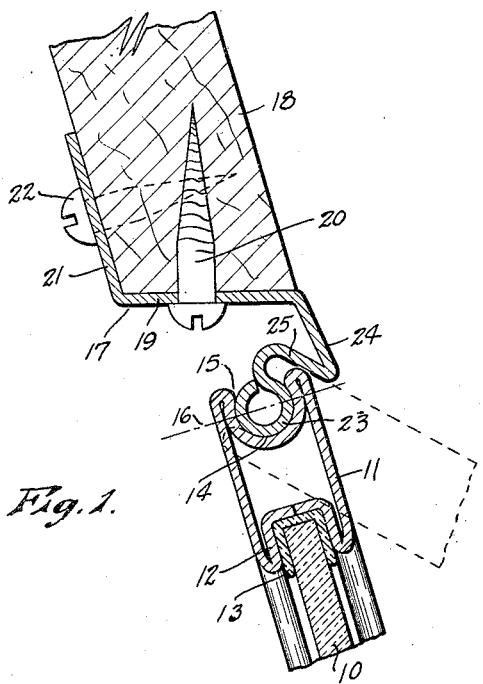
Fig. 1 is a vertical section through the upper portion of a wind shield and a visor strip showing my improved hinge construction.
Figure 2:
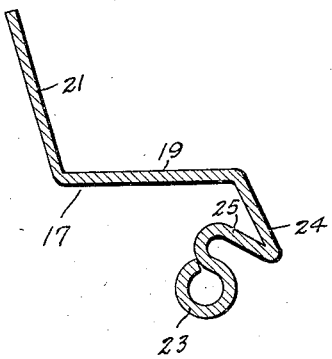
Fig. 2 is a transverse section of the supporting or anchor member of the hinge.

Referring to Figs. 1 and 2 the glass wind shield is shown at 10 mounted in a suitable frame of which the top bar 11 is a metal tube. This tubing has a U-shaped channel 12 at its lower side to receive the edge of the glass with a rubber channel or cushioning member 13 between them. At its opposite edge this tubular bar is provided with a curved channel 14 opening through the opposite edge of the bar. This channel is substantially semi-circular in cross section, but is extended farther than a semi-circle so that its widest part is spaced inwardly from the open side 15 of the channel. That is, the curved portion of the channel is somewhat more than semi-circular and the open side of the channel is of less width than the widest portion of the channel which is on the diagonal line 16.

Cooperating with this bar is an anchor member 17 secured to and preferably depending from the visor strip 18. This bar may have a horizontal portion 19 secured to the under edge of the visor strip by any suitable means, such as screws 20, and it may also have an extension 21 on the back of the visor strip secured thereto by any suitable means, as screws 22, or either one of these portions alone may be used. As for instance, the extension 21 may be omitted, but the use of both 19 and 21 is preferred as it gives a stronger construction. The depending portion of this anchor member is rolled into a substantially cylindrical bar portion 23 which is of a size to fit the curved channel 14 in the bar 11 of the wind shield frame. This should make a good fit but should permit relative turning movements between the anchor member 17 and the bar 11 to permit the lower end of the wind shield to be swung laterally outward, as indicated in dotted lines. The anchor member and the wind shield bar are assembled by sliding the bar portion 23 longitudinally into the channel 14 from one end thereof.

It is preferred that this anchor or hinge member 17 be extended downwardly from the front of the visor strip 18, as indicated at 24, and then be bent backwardly and upwardly as indicated at 25 and then downwardly and rolled over to form the bar portion 23. The portion 24, therefore, extends forwardly and somewhat below the upper outer edge of the bar 11 and forms a weather shed to prevent water being driven into the hinge connection between the anchor member 17 and the bar 11. It is to be understood that the channel 14 in the bar 11 extends longitudinally thereof throughout the entire length of this bar and wind shield, and that the anchor bar 17 and the bar portion 23 thereof also preferably extends throughout the entire length of the shield so as to support this shield throughout its entire length. It will be obvious that this gives a very uniform and reliable support for the shield for the entire length thereof, and that there is no separate hinge pin required which is liable to rattle, and there is no danger of cramping on the wind shield frame due to having loops for the hinge pin out of alignment as in the old types of hinges.

Figure 3:
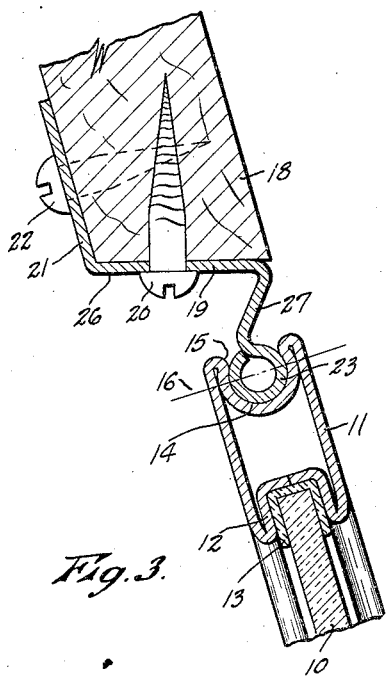
Fig. 3 is a section similar to Fig. 1 showing a slightly different construction.
Figure 4:
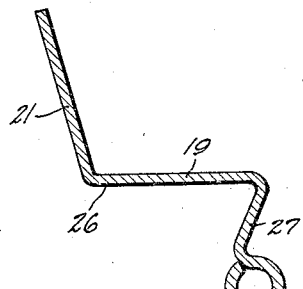
Fig. 4 is a transverse section of the supporting or anchor member of Fig. 3.

The form shown in Figs. 3 and 4 is substantially the same as that shown in Figs. 1 and 2 except that in this form the end of the bar 26, corresponding to the anchor bar 17 in the first form, extends downwardly at 27 and is rolled into the bar portion 23 without the weather shed 24. The first form, however, is the preferred form as it prevents entrance of moisture into the hinge without the use of an extra weather shed construction. The wind shield bar 11 in this form is the same as in the first form.

Having thus set forth the nature of my invention, what I claim is:

1. In a device of the character described, a wind shield including a bar provided with a longitudinal open channel of greatest width inwardly of its open side, and an anchor bar adapted to be secured to a support having a depending portion bent into a substantially cylindrical portion to fit into said channel to form a hinge connection, said depending portion extending downwardly in front of the upper edge of the bar to form a weather shed.

2. In a device of the character described, a wind shield including a longitudinally extending tubular bar at its upper edge provided with a longitudinal curved channel having its widest portion inwardly of its open side, and a sheet metal anchor member adapted to be secured to the visor strip of a vehicle and provided with a depending portion rolled upon itself to form a cylindrical bar to fit the said channel, said depending portion being extended downwardly in front of the upper edge of the said tubular bar and then backwardly over the same to form a weather shed.

3. In a device of the character described, a wind shield including a bar, and an anchor bar adapted to be secured to a support, one of said bars intermediate its edges being bent to provide a longitudinal open cylindrical channel of greatest width inwardly of its open side, the other of said bars having a portion bent into a substantially cylindrical portion to fit snugly in said channel and form a hinge connection, the portion connecting the upper of said bars to its support extending downwardly in front of the upper edge of said upper bar to form a weather shed.

4. In a device of the character described, a wind shield including a longitudinally extending tubular bar at its upper edge, and a sheet metal anchor member adapted to be secured to the visor strip of a vehicle and provided with a depending portion formed into a bar, one of said bars intermediate its edges being bent to provide a longitudinal cylindrical channel having its widest portion inwardly of its open side, the other of said bars having a portion in cylindrical form to fit snugly within the said channel, the portion connecting the anchor member to its depending bar being extended downwardly in front of the upper edge of the said channel to form a weather shed.

In testimony whereof I affix my signature.

PHILIP CARLSON.